June 13, 1933. R. P. F. LIDDELL 1,913,401
FILTER
Original Filed Sept. 28, 1929 3 Sheets-Sheet 3
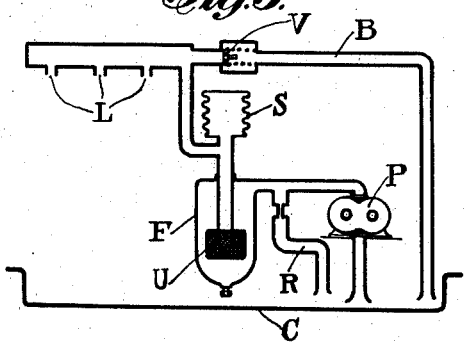
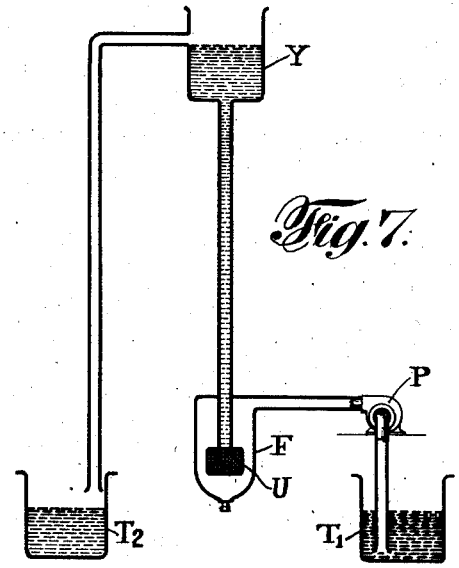
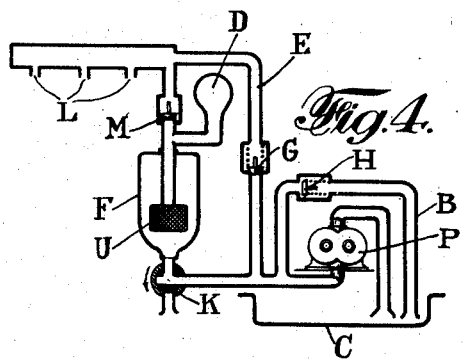
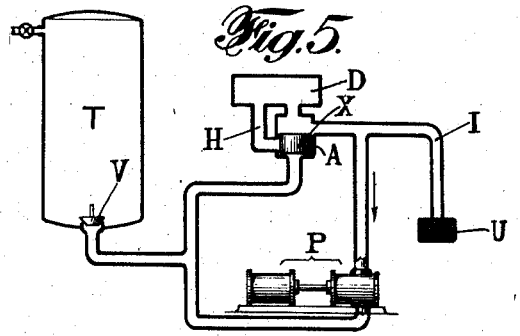
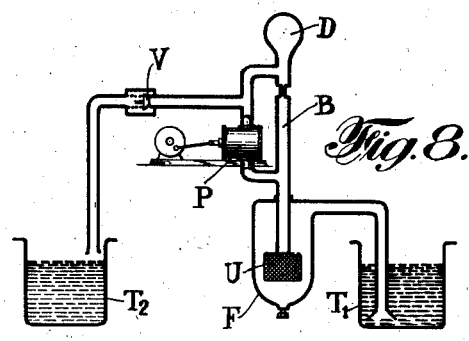
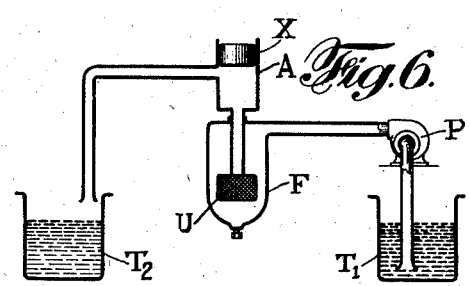
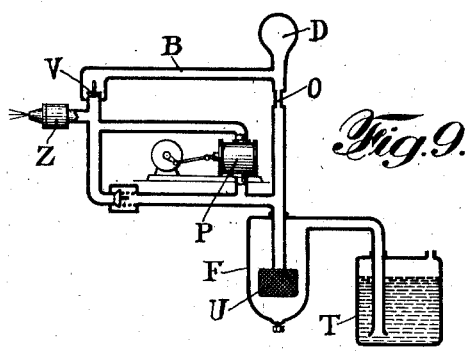
INVENTOR
Robert P. F. Liddell
BY
Kenyon & Kenyon
ATTORNEYS Patented June 13, 1933

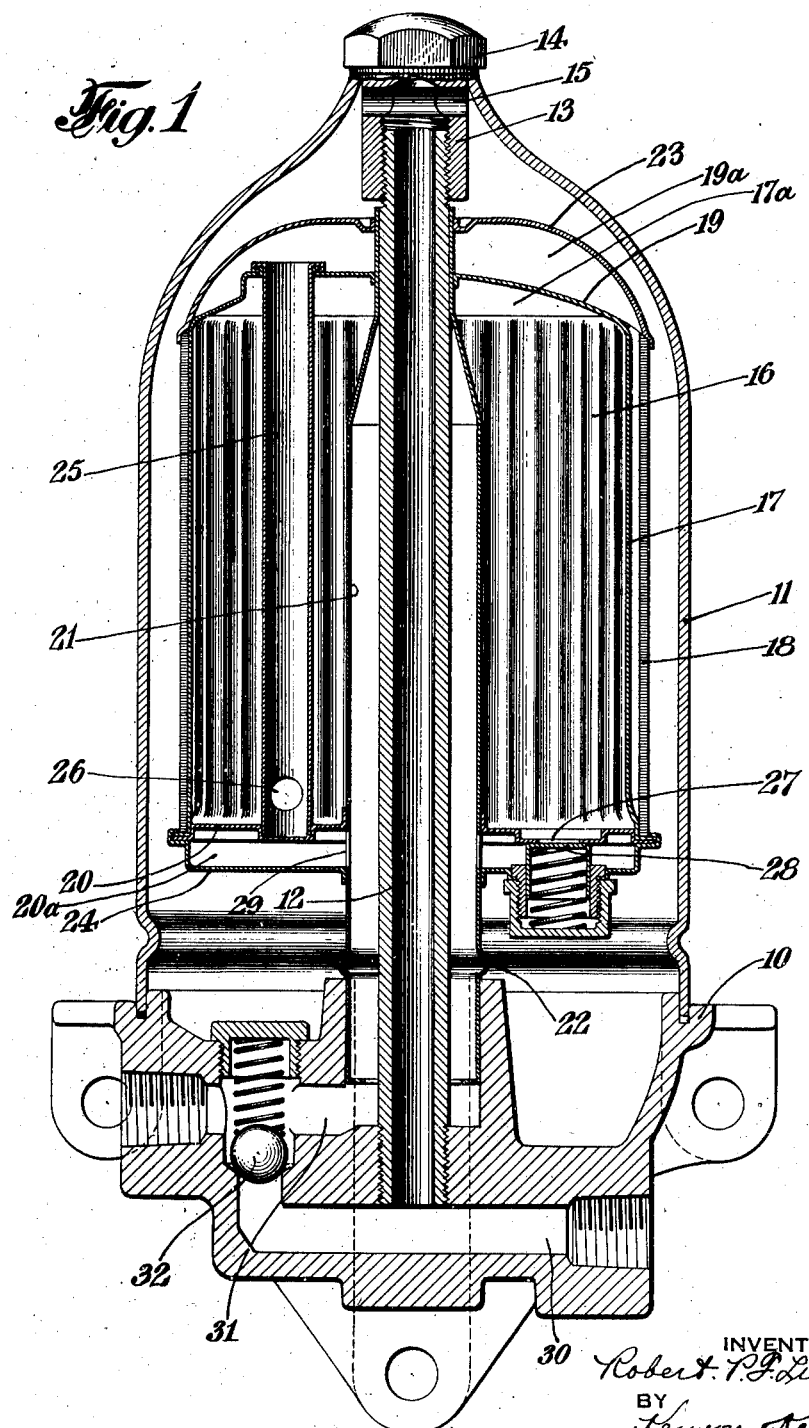

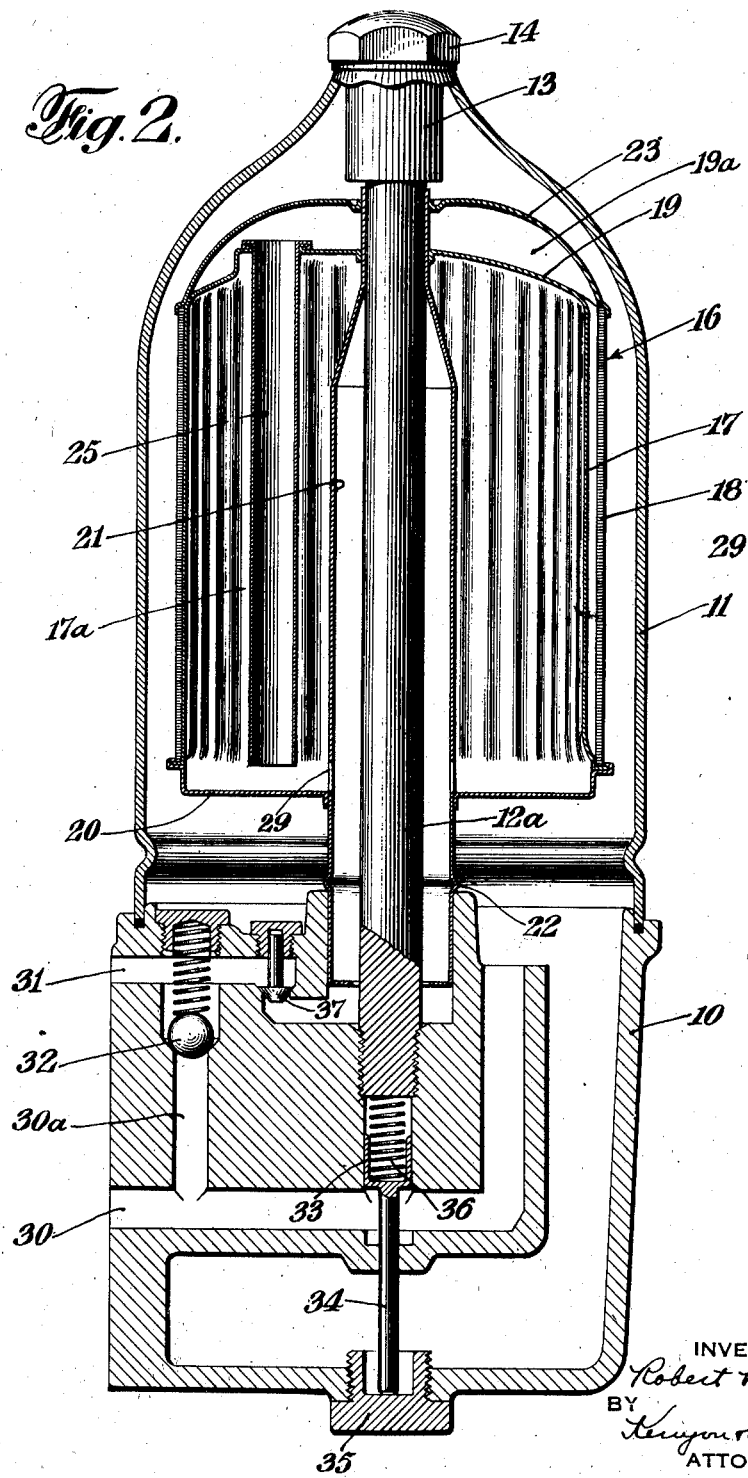

1,913,401

UNITED STATES PATENT OFFICE

ROBERT P. F. LIDDELL, OF MORRIS TOWNSHIP, MORRIS COUNTY, NEW JERSEY, ASSIGNOR TO MOTOR IMPROVEMENTS, INC., OF NEWARK, NEW JERSEY, A CORPORATION OF DELAWARE

FILTER

Application filed September 28, 1929, Serial No. 395,848. Renewed March 23, 1932.

This invention relates to improvements in filtering systems for removing or recovering solid substances suspended in fluids.

An object of this invention is a filtering system having provision for directing filtered fluid reversely through the filtering unit for the purpose of removing from the same the solid material filtered from the fluid and collected by the filtering unit.

In a filter system embodying this invention, in addition to means for causing fluid containing undesirable solid substances to flow through the filter unit, means are provided for utilizing the filtered fluid to build up a supply of potential energy and are so constructed and arranged as to permit the utilization of the potential energy thus built up to force filtered fluid reversely through the filter unit upon cessation of the flow of contaminated fluid through said unit. The reverse flow of filtered fluid through the filtering unit depends upon the temporary reduction of the pressure applied to the contaminated fluid below that to which the filtered fluid is subjected.

The filter system may be of a type in which the fluid is circulated through an apparatus which depends upon a continuous supply of the fluid for proper operation and which continuously adds to the fluid contaminating matter which is removed substantially as fast as it is produced by repeatedly passing the fluid through the filtering unit; or the system may be of a type in which the fluid is passed but once through the filtering unit. Preferably the arrangement is such that reverse flow of filtered fluid through the filtering unit will occur whenever the flow producing means ceases to function after a period of operation; but, in a circulating system such as above referred to, a valve may be provided in the inlet to the filter in combination with a by-pass around the filter unit and a drainage port whereby temporary reverse flow of filtered fluid through the filtering unit may be effected without interrupting the flow of fluid to the apparatus. In each type of system, the solid material filtered from the fluid and collected by the unit is removed from the unit by the reverse flow of filtered fluid through the unit.

This invention is applicable to the filtration of any fluid contaminated with solid substances. The invention may be embodied in the lubricating system of an internal combustion engine, in the supply system for an oil burner, in a system merely for cleaning liquid without respect to its subsequent use, in a system for cleaning air supplied to an air compressor or any other system wherein frequent cleaning of the filter unit is desirable.

Other objects, novel features and advantages of this invention will be apparent from the following description and accompanying drawings, wherein:

Fig. 1 is a vertical section through one type of filter.

Fig. 2 is a section through a second type of filter, and

Figs. 3 to 9 inclusive are diagrammatic illustrations of certain filtering systems embodying the invention.

Referring now to Fig. 1, there is disclosed a filter in which the casing comprises a base 10 and a cover 11. The cover 11 is of uniform thickness and the major portion thereof is cylindrical while its upper end is contracted along an ogee curve and terminates in an aperture of considerably less diameter than that of the main portion of the cover. The lower end of the cover 11 fits in a groove provided in the base 10, the groove being of substantially the same width as the thickness of the cover wall and a gasket being arranged in the bottom thereof. A pipe or hollow stud 12 is threaded to the base 10 and extends the full length of the cover 11. The boss 13 of a clamping member 14 extends through the aperture in the cover 11 and has a threaded connection with the end of the stud 12. The clamping member 14 serves to hold together the base 10 and the cover 11 and is provided with a passageway 15, the purpose of which will later be apparent.

A filter unit 16 is arranged within the casing and is supported by the pipe 12. This filter unit may and preferably does comprise a cylinder formed of a helically wound metal ribbon 18, the turns of which are slightly spaced by transverse ribs extending from one face. Such a filter unit is disclosed in detail and claimed in the copending application of Robert P. F. Lindell; Ser. No. 368,381 filed June 4, 1929. The filter unit or cylinder surrounds and is supported by a fluted drum 17 which is provided with a top wall 19 and a bottom wall 20 which define a chamber 17ª and which are provided with central alined apertures through which extends a tube 21. This tube snugly fits around the upper end of the post 12, but is spaced therefrom through the remainder of its length and its lower end fits snugly within a recess in the head 10. An annular rib 22 limits the extent to which the tube projects into this recess. The drum 17 is provided with top and bottom covers 23 and 24 which form, with the top and bottom walls 19 and 20 an upper chamber 19ª and a lower chamber 20ª. The flutes of the drum 17 provide passageways through which filtered oil is conducted to the upper chamber 19ª. A conduit 25 leads from the upper chamber to the bottom of the middle chamber 17ª and is provided with an outlet port 26. A port 27 is provided in the bottom wall 20 to permit oil to escape into the lower chamber 20ª. This port is controlled by a spring loaded check valve 28. The lower chamber communicates through ports 29 with the annular space between the post 12 and the pipe 21. The chamber 17ª of the drum constitutes an air dome and always contains a supply of air.

In the head 10 there is provided an inlet passage 30 which communicates with the tubular post 12 and there is also provided an outlet passage 31 which communicates with the annular space between the post 12 and the tube 21. The inlet passage 30 may be extended to communicate with the outlet passage 31 to form a by-pass controlled by a relief valve 32.

When this filter is connected in a circulating system such as the lubricating system of an internal combustion engine, the discharge pipe from the pump is connected to the inlet passage 30 and the outlet passage 31 may be connected either to the pipe through which oil is delivered to the engine bearings or it may be connected for the direct return of filtered oil to the crank case. The check valve 28 is set at a pressure sufficient to compress the air in the drum 17 to produce the reverse flow for cleaning the filter unit as hereinafter described.

The contaminated oil enters through the passage 30, rises through the tube 12 and is discharged into the casing through the passage 15. The oil then passes through the filtering helix 16 and is delivered through the flutes of the drum 17 into the upper chamber 19ª from whence it continues through the conduit 25 and port 26 into the chamber 17ª. The chamber 17ª fills up with oil until air trapped therein is compressed to such an extent that the pressure of the oil against the check valve 28 exceeds the pressure at which the valve is set. This valve then opens and allows oil to escape from the drum into the passage 31 by way of the ports 27 and 29 and the annular passageway between the post 12 and pipe 21, the air within the drum being maintained under compression. This condition exists as long as the pump continues to function. When the pump ceases to function, as upon stopping of the engine, the pressure in the inlet passage is reduced, either by leakage through the pump or means provided to effect leakage; the valve 28 closes and the pressure within the casing 11 outside of the helix 18 falls below the pressure inside the drum.

By reason of this reversal in pressure conditions, the air compressed within the drum exerts pressure on the fluid contained within the middle chamber 17ª, conduit 25 and the upper chamber 19ª, thus causing flow from the upper chamber downwardly along the flutes and outwardly through the filtering helix, thereby washing off the material accumulated on the outer face of the filtering cylinder, this material dropping into the bottom of the casing. The entire contents of the drum, conduit and upon chamber may be forced out through the filter helix or only a portion thereof may be forced out. This depends upon the amount of air under compression, the amount varying after a period of operation depending upon whether additional air is brought in with the oil as well as whether the outgoing oil carries air with it. In any event, however, there will be sufficient air at all times to insure reverse flow of a portion of the oil. Where the outlet passage communicates with the main bearings of the engine, the loaded check valve 28 may be dispensed with when the bearings themselves offer sufficient resistance to effect the desired reverse flow of filtered oil through the filtering unit. Similarly, where the cohesiveness of the filter cake formed on the helix 18 is low, the check valve may be dispensed with and the gravity head of the fluid in the flutes and the upper chamber of the drum relied on to cause the back flow. It is only necessary to produce in the normal operation of the filter, a potential energy operating on the filtered fluid, which energy is normally ineffective to prevent filtering flow, but which on cessation of the filtering operation produces a reverse flow and thereby cleans the filter and it will be apparent to those skilled in the art that the particular means for accomplishing this effect and operation may be modified appropriately to the fluid under filtration and the character of contamination removed.

In the modification disclosed in Fig. 2, 10 is the head and 11 is the cover. A solid post 12ª is threaded into the head 10 and the cover 11 is held in place by a clamping member 14 having its boss 13 threaded on the end of the post 12ª. The filter unit 16 again comprises a helix formed from metal ribbon 18 and surrounds a fluted drum 17 which is provided with an upper wall 19 and a lower wall 20. A pipe 21 surrounds the post 12ª and snugly fits the post at its upper end, while at its lower end it is spaced therefrom. A rib 22 limits the extent to which the pipe 21 extends into the recess in the head 10. The drum 17 is provided with a top cover 23 to form with the upper wall 19 an upper chamber 19ª. A conduit 25 leads from the upper chamber and discharges into the bottom portion of the drum. Ports 29 establish communication between the chamber 17ª and the annular space between the post 12ª and the pipe 21. In the head 10 there is provided an inlet passage 30, and an outlet passage 31 between which there is provided a by-pass 30ª controlled by the relief valve 32. A spring actuated valve 33 is provided to close the inlet passage 30. This valve has a stem 34 which is engaged by the plug 35 which normally closes the drainage port for the head 10. The plug 35 holds the valve 33 in open position and the spring 36 is provided to force the valve into closing position when the plug 35 is removed. A check valve 37 is provided in the outlet passage 31 and prevents flow from the by-pass 30ª into the annular space between the post 12ª and the pipe 21.

Oil to be filtered is supplied through the passage 30 to the interior of the filter, after which it passes through the filtering cylinder and is conducted by the flutes into the upper chamber 19ª of the drum. From this chamber, it passes through the conduit 25 into the chamber 17ª of the drum. From this chamber it escapes by way of the ports 29 into the discharge passage 31, the check valve 37 yielding to permit flow in this direction. The air contained within the drum is compressed until it is under the pressure to which the oil is subjected on being discharged from the filter.

When it is desired to clean the filtering unit, the drain plug 35 is removed, whereupon the valve 33 is forced by the spring 36 into the inlet passage to close the same. The oil now flows through the by-pass 30ª and out through the discharge passage 31. There is a tendency for the oil to flow toward the filtering unit but this is prevented by the valve 37. The pressure on the inlet side of the filter unit drops substantially to zero upon the opening of the drain port and the pressure of the air within the drum is effective to force filtered oil reversely through the filtering unit in the manner previously described. With this type, substantially all the oil in the casing is removed from the system during the cleaning of the filter unit, but there is no interruption in the operation of the system. To restore the filter to operation in the system it is only necessary to replace the drain plug 35.

In the specific embodiments disclosed in Figs. 1 and 2, the means for maintaining a supply of filtered liquid under pressure has been shown as an air dome. There are, however, many other means for maintaining a supply of filtered liquid under pressure among which may be mentioned by way of example, sylphon bellows, weighed or spring loaded pistons, fluid head, or the like. Examples of various systems are diagrammatically illustrated in Figs. 3 to 9. In these illustrations, it will be understood that for the sake of clearness the parts are shown in their functional relationship without regard to physical structure. Whatever form of physical structure may be employed it will be understood that the pressure maintaining means wherein the potential energy is stored is connected with the outlet side of the filter unit.

In Fig. 3 there is disclosed a system in which lubricating oil is circulated from a reservoir through the bearings of a machine, such for example, as the bearings of an internal combustion engine. The pump P draws oil from the reservoir C and discharges through a suitable pipe into the filter F which is provided with a filter unit U. The outlet from the filter communicates with the leads L for the bearings of the machine and also with the sylphon bellows S. The resistance offered by the bearings of the machine is sufficient to cause filtered oil to expand the bellows thereby building up a supply of potential energy for use to effect reverse flow of oil through said filter unit. Reverse flow of filtered oil through the filtering unit U is effected, whenever the pump stops functioning. The reverse flow of filtered oil is effected by causing the pressure on the inlet side of the filter unit to drop more rapidly than the pressure on the outlet side of the filter unit when the pump stops. This is accomplished by utilizing a pump of such type or construction that, when at rest, it leaks oil more rapidly than do the bearings or by providing a bleed R leading to the reservoir from between the pump and the filter in the event that the pump is of such a type that it does not leak more rapidly than the bearings. It is, of course, understood that where a bleed is made use of, it must offer less resistance than the bearings in order to insure proper reverse flow through the filter unit. A blow-off pipe B controlled by a relief valve V may be provided to prevent excessive pressure in the system.

Fig. 4 also discloses a circulating system which is adapted for use in connection with lubrication of the bearings of a machine or internal combustion engine. The pump P draws oil from the reservoir C and delivers the same to the filter F which is provided with a filter unit U. The outlet from the filter communicates with the bearing leads L and also with the air dome D. A by-pass E controlled by a relief valve G is provided around the filter F and a blow-off pipe B controlled by a relief valve H may be provided to prevent excessive pressure in the system. The flow of oil to the filter F is controlled by a two-way valve K which may be turned to shut off the flow of oil to the filter and permit drainage of oil from the filter F into the reservoir C. A check valve M prevents reverse flow from the by-pass E to the filter F.

Normally, the valve K is set as shown and oil is delivered by the pump P through the filter to the bearing leads L. The resistance offered by the bearings is sufficient to cause the filtered oil to compress the air in the dome D to build up a supply of potential energy for use in producing reverse flow of oil through the unit U. Such reverse flow is effected by turning the valve K to disconnect the filter from the pump and permit the oil in the filter to drain out, or, if desired to drain back into the reservoir, thereby reducing the pressure on the inlet side of the filter unit below that applied to the outlet side by the compressed air in the dome D. Upon closing of the valve K, oil flows by way of the by-pass E to the bearing leads L so that the supply of oil to the bearings is not interrupted. There is a tendency for oil to flow from the by-pass reversely through the outlet from the filter, but this is prevented by the check valve M.

Fig. 5 discloses an embodiment of the invention in connection with an air compressor system. In this system an air compressor P sucks air through a filter unit U and delivers it to a tank T, the inlet to which is controlled by a check valve V. The outlet from the compressor communicates with the lower end of a vertical cylinder A, the upper end of which communicates with an air dome D. In the cylinder A is provided a piston X, which in its lower position overlies the entrance to the cylinder. A branch pipe H leads from the cylinder A to the dome D and is so located that it is closed off by the piston when in its lower position. A conduit I leads from the upper portion of the cylinder A to the outlet side of the filter unit U and is so arranged that it is closed off by the piston X when in its upper position. The branch conduit H is unobstructed by the piston X when in its upper position and the conduit I is unobstructed by the piston X when in its lower position.

Normally, the compressor P draws air through the unit U and delivers it under pressure to the tank T. A portion of the air presses against the piston X thereby lifting the same and permitting the flow of air under pressure through the branch H into the dome D. When the air compressor stops functioning, the pressure applied to the piston A will decrease below that existing in the dome D, whereupon the piston A will drop by gravity, closing the branch H and opening the pipe I. The compressed air in the dome D will thereupon rush through the pipe I and reversely through the filter unit U, thereby cleaning the same.

Fig. 6 discloses a non-circulating filtering system. The dirty liquid is contained in tank $T_1$ and the clean liquid is discharged into tank $T_2$. The dirty liquid is caused to flow from the tank $T_1$ to the filter F by means of pump P which in this instance is shown as of the centrifugal type, although it might be of the positive displacement type in which event a bleed should be provided to insure proper leakage. The filtered liquid is discharged from the filter into the base of a cylinder A in which is slidably mounted a weighted piston X. A conduit leads from the side wall of the cylinder A and discharges into the tank $T_2$. The pump P forces the liquid through the filter and the pressure exerted on the discharged liquid lifts the piston X thereby permitting the liquid to discharge into the tank $T_2$. When the pump P is stopped, the piston X exerts pressure on the liquid contained in the cylinder A and forces the same reversely through the filtering unit, this reverse flow being permitted by reason of the leakage through the pump P. As the piston X moves downwardly it closes the discharge pipe leading to the tank $T_2$ and so prevents escape of liquid from cylinder A otherwise than by reverse flow through the filter.

In the system disclosed in Fig. 7, a column of filtered liquid is utilized to supply the pressure for effecting the reverse flow through the filtering unit. In this figure, $T_1$ is the tank for dirty liquid and $T_2$ the tank for clean liquid, while P is the pump and F is the filter. The filter outlet communicates with a stand pipe Y which is of sufficient height to furnish the head necessary to cause the reverse flow. The standpipe is provided with an overflow conduit which leads to the tank $T_2$ and filtered oil is continuously discharged through this conduit, while the pump P is functioning. When the pump P ceases to function, the head of liquid in the stand pipe is effective to cause reverse flow of filtered liquid through the filter F, such flow being permitted by leakage through the pump P or suitable bleed.

The system disclosed in Fig. 8 involves suction filtration as distinguished from pressure filtration. The pump P sucks dirty liquid from the tank $T_1$ through the filter F and discharges filtered liquid into the tank $T_2$ through a conduit equipped with a resistance valve V. An air dome D communicates with the discharge conduit between the pump P and the valve V and also communicates through a bleed B with the inlet to the pump. In normal operation, air is compressed in the dome D, the extent to which it is compressed being dependent upon the pressure exerted by the valve V. When the pump P ceases to function, the air compressed within the dome D forces filtered oil through the bleed B and reversely through the filtering unit to effect cleaning of the same, the valve V providing the necessary resistance to insure this action.

In Fig. 9 there is disclosed an oil burner system equipped with a filter and embodying an arrangement for providing reverse flow of filtered oil through the filtering unit. In this system, the oil is sucked through the filter by the pump. Oil is drawn from the tank T through the filter F by the pump P and is delivered to the oil burner Z. A by-pass controlled by a relief valve is provided around the pump to prevent excessive pressure in the system. A bleed line B leads around the pump and connects with an air dome D. Between the pump P and the outlet side of the filter, there is provided a restricted orifice O and between the oil burner and air dome D there is provided a check valve V. When the pump P is operating, the major portion of the oil flows to the oil burner, but some passes into the bleed B, thereby compressing the air within the dome D. When the pump P ceases to function, the air compressed in the dome exerts pressure on the oil contained therein and in the bleed line, thereby closing the valve V and causing the oil to flow through the orifice O and reversely through the filter unit. The orifice O is sufficiently restricted as to prevent excessive bleeding of the system when the pump is operating. The by-pass for the pump P is merely to prevent excessive pressure in the system and is not essential, although it is desirable.

In the various systems above described, the principle of operation is the same. In each instance, the reverse flow is caused by maintaining pressure on a supply of filtered oil while reducing the pressure applied to the incoming oil. The various means above disclosed for maintaining pressure on the filtered oil are interchangeable and each one of these means may be utilized in connection with any one of the systems. Moreover, it is to be understood that other means for maintaining the pressure on the filtered oil may be utilized and that various modifications may be made without in any way departing from the spirit of the invention as defined in the appended claims.

I claim:

1. In a filter, an air trap comprising a fluted drum having its side wall imperforate, a cylindrical filtering unit surrounding said drum and forming channels therewith open at one end of the drum, a reservoir at one end of said drum into which said channels discharge, a passageway connecting the reservoir with the lower portion of said drum, and an outlet from the lower portion of said drum.

2. In a filter, an air trap comprising a fluted drum having its side wall imperforate, a cylindrical filtering unit surrounding said drum and forming channels therewith open at one end of the drum, a cap fitted over one end of said drum and forming with the end thereof a reservoir into which said channels discharge, a passageway connecting said reservoir with the lower portion of said drum, and an outlet from the lower portion of said drum.

3. In a filter, an air trap comprising a fluted drum, a cylindrical filtering unit surrounding said drum and forming therewith channels open at the upper end of the drum, a reservoir above said drum into which said channels discharge, a conduit leading from said reservoir and discharging into the lower portion of said drum, and an outlet from the lower portion of the drum.

4. In a filter, an air trap comprising a fluted drum, a cylindrical filtering unit surrounding said drum and forming therewith channels open at the upper end of the drum, a cap fitted over the upper end of said drum and forming with the upper end thereof a reservoir into which said channels discharge, a conduit leading from said reservoir above the discharge ends of said channels and discharging into the lower portion of said drum, and an outlet from the lower portion of the drum.

5. In a filter, a cylindrical filtering unit comprising a helix formed of thin metal ribbon having its faces normal to the axis of the helix, and means for spacing the turns of the helix to provide filtering interstices, an air trap comprising a fluted drum having its side wall imperforate, said unit surrounding said drum and forming channels therewith open at one end of the drum, a reservoir at one end of said drum into which said channels discharge, a passageway connecting said reservoir with the lower portion of said drum, and an outlet from the lower portion of said drum.

6. In a filter, a cylindrical filtering unit comprising a helix formed of thin metal ribbon having its faces normal to the axis of the helix and means for spacing the turns of the helix to provide filtering interstices, an air trap comprising a fluted drum having its side wall imperforate, said unit surrounding said drum and forming channels therewith open at one end of the drum, a cap fitted over said end of the drum and forming therewith a reservoir into which said channels discharge, a passageway connecting said reservoir with the lower portion of said drum, and an outlet from the lower portion of said drum.

7. In a filter, a cylindrical filtering unit comprising a helix formed of thin metal ribbon with its faces normal to the axis of the helix and means for spacing the turns to form filtering interstices, a fluted drum having its side wall imperforate and closed at the top to constitute an air trap, said unit surrounding said drum and forming channels therewith open at one end of the drum, a cap fitted over said end of the drum and forming therewith a reservoir into which said channels discharge, a passageway connecting said reservoir and the lower portion of said drum, and an outlet from the lower portion of the drum.

8. In a filter, a fluted drum closed at the top to constitute an air trap, a cylindrical filtering unit surrounding said drum and forming therewith channels open at one end of the drum, a cap fitted over the end of said drum and forming therewith a reservoir into which said channels discharge, a passageway between said reservoir and the lower end of the drum, and an outlet from the lower portion of the drum.

9. In a filter, a fluted drum, a cylindrical filtering unit surrounding said drum and forming therewith channels open at one end of the drum, and a cap fitted over said end of the drum and forming herewith a reservoir into which said channels discharge, said drum having an inlet passage leading from said reservoir and an outlet passage, one of said passage having a portion thereof at a higher level than the open ends of said channels whereby the latter are sealed with liquid.

10. In a filter, a fluted drum having an outlet at the bottom, a cylindrical filtering unit surrounding said drum and forming therewith channels extending to the upper end of the drum, means cooperating with the upper end of the drum to form a reservoir communicating with said channels to receive filtered fluid therefrom and a closure for the upper end of the drum, and a conduit leading from the reservoir and discharging into the lower end of the drum.

11. In a filter, a fluted drum closed at the top to constitute an air trap, a cylindrical filtering unit surrounding said drum and forming therewith channels extending to the upper end of the drum, a cap fitted over the upper end of said drum and forming with the top of the drum a reservoir into which said channels discharge, a conduit leading from said reservoir above the discharge ends of said channels and discharging into the lower portion of said drum, and an outlet from the lower portion of the drum.

12. In a filter, a fluted drum having its side wall imperforate and closed at the top to constitute an air trap, a cylindrical filtering unit surrounding said drum and forming channels therewith extending to the end of the drum, an element adjacent the drum and forming therewith a reservoir into which said channels discharge, a conduit connecting said reservoir with the lower portion of said drum and an outlet from the lower portion of said drum.

13. In a filter, a fluted drum having its side wall imperforate and closed at the top to constitute an air trap, a cylindrical filtering unit surrounding said drum and forming channels therewith extending to the end of the drum, a cap fitted over one end of said drum and forming with the end of the drum a reservoir into which said channels discharge, a conduit connecting said reservoir with the lower portion of said drum and an outlet from the lower portion of said drum.

14. In a filter, a casing, an inlet therefor, a cylindrical filtering member provided with a cover at either end, an air container within said filtering member, said container forming a chamber with one of said covers and being of less cross-sectional area than said filtering member, a passageway connecting said chamber and said container, an outlet from said container, and means for causing air compressed within said container to force filtered fluid reversely through said filtering member upon cessation of forward flow therethrough.

15. In a filter, a casing, an inlet therefor, a cylindrical filtering member provided with a cover at either end, an air container within said filtering member, said container forming a chamber with one of said covers and being of less cross-sectional area than said filtering member, a passageway connecting said chamber and said container, an outlet from said container, and a check valve in said outlet.

16. In a filter, a casing, an inlet therefor, a cylindrical filtering member provided with a cover at either end, an air container within said filtering member, said container forming a chamber with one of said covers and being of less cross-sectional area than said filtering member, a passageway connecting said chamber and the interior of said container, an outlet from said container, and a loaded check valve in said outlet.

17. In a filter, a casing, a cylindrical filtering unit, an air container within said filtering unit, a cover for one end of said filtering unit, means including a conduit extending to the bottom of said container for conducting filtered fluid thereinto, an outlet from said container, and means for causing air compressed within said container to force filtered fluid reversely through said filtering unit upon cessation of forward flow therethrough.

18. In a filter, a casing, a cylindrical filtering unit, an air container within said filtering unit, a cover for one end of said filtering unit, means including a conduit extending to the bottom of said container for conducting filtered fluid thereinto, an outlet from said container, and a check valve in said outlet.

19. In a filter, a casing, an inlet therefor, a valve for closing said inlet, a filtering unit, an air trap, means for delivering filtered fluid to said air trap, an outlet therefrom, a by-pass between said inlet and outlet, a relief valve controlling the same, and a check valve in said outlet.

20. In a filter, a casing having an inlet, a valve for closing said inlet, a drain plug adapted to engage said valve and normally hold it open, a filtering unit, an air trap, means for delivering filtered fluid to said air trap, an outlet therefrom, a by-pass between said inlet and outlet, a relief valve controlling the same, and a check valve in said outlet.

In testimony whereof, I have signed my name to this specification.

ROBERT P. F. LIDDELL.